United States Patent
Edling et al.

(10) Patent No.: US 11,820,404 B2
(45) Date of Patent: Nov. 21, 2023

(54) METHOD FOR CREATING A PROBABILISTIC FREE SPACE MAP WITH STATIC AND DYNAMIC OBJECTS

(71) Applicant: Continental Automotive GmbH, Hannover (DE)

(72) Inventors: Frank Edling, Schwalbach (DE); Markus Lux, Frankfurt (DE); Hagen Stuebing, Oberursel (DE); Gunnar Juergens, Frankfurt (DE)

(73) Assignee: Continental Automotive GmbH

( * ) Notice: Subject to any disclaimer, the term of this patent is extended or adjusted under 35 U.S.C. 154(b) by 165 days.

(21) Appl. No.: 17/144,352

(22) Filed: Jan. 8, 2021

(65) Prior Publication Data

US 2021/0213978 A1    Jul. 15, 2021

(30) Foreign Application Priority Data

Jan. 9, 2020 (DE) .................... 10 2020 200 183.9

(51) Int. Cl.
*B60W 60/00* (2020.01)
*G06V 20/58* (2022.01)

(52) U.S. Cl.
CPC ...... *B60W 60/00276* (2020.02); *B60W 60/00272* (2020.02); *G06V 20/58* (2022.01);
(Continued)

(58) Field of Classification Search
CPC .......... G06V 20/58; B60W 2554/4041; B60W 2554/4049
See application file for complete search history.

(56) References Cited

U.S. PATENT DOCUMENTS 10,937,107 B2    3/2021  Shalev-Shwartz et al.
11,099,561 B1 *  8/2021  Kentley-Klay ........ G01C 21/32
(Continued)

FOREIGN PATENT DOCUMENTS

CN    110214264 A    9/2019
DE    102006060893   11/2007
(Continued)

OTHER PUBLICATIONS

Chinese Office Action for Chinese Application No. 202110013386. X, dated Jun. 22, 2022, with translation, 27 pages.
(Continued)

*Primary Examiner* — Peter D Nolan
*Assistant Examiner* — Mikko Okechukwu Obioha
(74) *Attorney, Agent, or Firm* — RatnerPrestia

(57) ABSTRACT

The invention relates to a method for creating a probabilistic free space map with static (2*a*, 2*b*, 3) and dynamic objects (V1-V7), having the following steps:
  retrieving (S1) static objects (2*a*, 2*b*, 3) as well as a perception area polygon (WP) from an existing environment model;
  collecting (S2) predicted trajectories (T1, T2) of dynamic objects (V1-V7);
  merging (S3) the static objects (2*a*, 2*b*, 3) of the perception area polygon (WP) and the predicted trajectories (T1, T2) in a first free space map;
  fixing (S4) a maximum prediction time;
  fixing (S5) prediction time steps;
  fixing (S6) a current prediction time and setting this current prediction time to the value 0 in order to fix the start of a fixed prediction time period;
  fixing (S7) confidence regions (K) around the static (2*a*, 2*b*, 3) and dynamic objects (V1-V7);
  fixing (S8) at least one uncertain region (U) around at least one static (2*a*, 2*b*, 3) or dynamic object (V1-V7);
(Continued)

Fig. 1 producing (S9) a first probabilistic free space map for the current prediction time;
producing (S10) at least one further free space map for at least one prediction time step;
evaluating (S11) the produced free space maps.

11 Claims, 3 Drawing Sheets

(52) U.S. Cl.
CPC ............... *B60W 2554/4041* (2020.02); *B60W 2554/4049* (2020.02)

(56) References Cited

U.S. PATENT DOCUMENTS

| | | |
|---|---|---|
| 11,555,903 B1* | 1/2023 | Kroeger ................ G01S 17/931 |
| 2002/0121989 A1 | 9/2002 | Burns |
| 2007/0073477 A1 | 3/2007 | Krumm et al. |
| 2013/0054106 A1 | 2/2013 | Schmüdderich et al. |
| 2017/0101097 A1* | 4/2017 | Buchner ............. B60W 30/143 |
| 2018/0188041 A1 | 7/2018 | Chen et al. |
| 2019/0023266 A1 | 1/2019 | Kouri et al. |
| 2019/0234751 A1 | 8/2019 | Takhirov |
| 2020/0174481 A1* | 6/2020 | Van Heukelom ........................... B60W 60/0015 |
| 2020/0353951 A1* | 11/2020 | Spehr ................ B60W 60/0025 |
| 2021/0009156 A1* | 1/2021 | Hu ......................... G06V 20/56 |
| 2021/0200221 A1* | 7/2021 | Omari .................. G05D 1/0212 |

FOREIGN PATENT DOCUMENTS

| | | |
|---|---|---|
| DE | 102014212478 | 12/2015 |
| DE | 102017103154 | 8/2018 |
| JP | 2017138660 A | 8/2017 |
| WO | WO 2018/078413 | 5/2018 |
| WO | WO 2018/149839 | 8/2018 |
| WO | 2018175441 A1 | 9/2018 |
| WO | WO 2019/136479 | 7/2019 |
| WO | 2019232355 A1 | 12/2019 |

OTHER PUBLICATIONS

German Search Report for German Patent Application No. 10 2020 200 183.9, dated May 29, 2020, 6 pages, German Patent and Trademark Office, Muenchen, Germany, with English partial translation, 5 pages.

Extended European Search Report and Examination Report for European Patent Application No. 20 21 3459, dated Mar. 29, 2021, 7 pages, European Patent Office, Munich, Germany, with English partial translation, 3 pages.

* cited by examiner

METHOD FOR CREATING A PROBABILISTIC FREE SPACE MAP WITH STATIC AND DYNAMIC OBJECTS

The invention relates to a method for creating a probabilistic free space map with static and dynamic objects associated with the probability-based reaction of the driving function.

So-called traffic jam assistance systems, which are based on a combination of adaptive cruise control (ACC) and a lane-keeping assistance system, are for example known from the prior art. Furthermore, so-called lane-change assistance systems are also currently being introduced, which admittedly have to be actively triggered or initiated by the driver. A reaction to the traffic and line information (objects) is realized either by a measurement of the relative distance from the objects and a control of the clearance (e.g. by ACC, lane-keeping assistant) or by the creation of a grid map having information about the probability of a grid cell being occupied (e.g. Dempster-Shafer's grid map for automated parking).

The current solutions (occupancy grid maps or a list of objects relative to the ego vehicle) merely provide information regarding the current state of the free space. A specific region (e.g. grid cell) can be marked as "measured as free"/"measured as occupied" or "not yet measured". However, the current maps do not contain any information regarding a predicted free space/occupied space in future as a function of the behavior of other road users. When a driving strategy is being planned, it must be known whether it is wise to move into a specific region in future if the desired objective is to achieve safe, comfortable and effective driving.

It is therefore an object of the present invention to provide a method which provides an improved free space map and overcomes the disadvantages of the prior art.

This object is achieved by the subject-matter of the independent Claim 1. Further advantageous configurations are the subject-matter of the subclaims.

The basic aim of the invention is how to handle uncertainties in the environment detection and the road user prediction. During autonomous driving, uncertain regions will always remain in the environment model during the detection of the environment. The problem for downstream driving functions is that a driver does not accept emergency interventions instead of gentle early reactions, e.g. the behavior of a system having poor prediction: one exemplary scenario would be if a road user going back into the lane is suddenly detected, which leads to emergency braking being triggered. Here, a driver would rather expect the system to slow down the vehicle gently or to change lanes early, since a driver would have already anticipated the road user going back into the lane several seconds before, for example.

The objective of the invention is to react early and comfortably to "uncertain regions" rather than not until a few seconds later when it is only possible to carry out an emergency intervention. A driver rather accepts comfortable reactions which later turn out to be unnecessary (e.g. slight deceleration without the service brake in order to allow said road user to go back into the lane, but the road user not actually doing so) than late emergency braking in response to a poor prediction about the road user going back into the lane.

Admittedly, objects with a low existence probability must not simply be ignored, as an emergency reaction is justified in rare but safety-critical cases.

The invention is based on the fundamental consideration that these aforementioned problems can be avoided by creating a probabilistic free space map which also includes information regarding predicted behavior and uncertainty in the prediction.

According to the invention, a method for creating a probabilistic free space map with static and dynamic objects therefore has the following steps:

retrieving static objects as well as a perception area polygon from an existing environment model;
collecting predicted trajectories of dynamic objects;
merging the static objects of the perception area polygon and the predicted trajectories in a map;
fixing a maximum prediction time;
fixing prediction time steps;
fixing a current prediction time and setting this current prediction time to the value 0 in order to fix the start of a fixed prediction time period;
fixing confidence regions around the static and dynamic objects;
fixing at least one uncertain region around at least one static or dynamic object;
producing a first probabilistic free space map for the current prediction time;
producing at least one further free space map for at least one prediction time step;
evaluating the produced free space maps.

The environment model used here is generated, for example, by means of a sensor data fusion from current sensor data of at least two environment detection sensors such as, for example, a radar and camera sensor. With regard to the static objects, the environment model can admittedly also be a saved environment model, e.g. a semantic grid map, wherein the corresponding data are retrieved based on a self-localization of the ego vehicle by means of GPS and/or landmark recognition. If a saved environment model is used, it is advantageous to update this in regular predefined cycles in order to be able to reliably consider any modifications in the static objects.

In the light of the invention, the perception area polygon describes a polygonal chain around the ego vehicle and constitutes the current 360° field of view. The influential variables for this polygon are, on the one hand, the sensor ranges and, on the other hand, also the geometry of the road (bends, summits, etc.).

If dynamic objects or other road users are sensed in the environment of the ego vehicle, one or more trajectories is/are predicted for each of the dynamic objects. The prediction of the respective trajectories is, for example, performed based on the direction of movement, speed and/or acceleration.

These aforementioned data are subsequently entered into a joint map which serves as a basis for the further method steps.

Furthermore, a maximum prediction time is fixed, by which the possible trajectories of the dynamic objects or of the other road users are predicted at an outside estimate. In addition, prediction time steps are fixed. This is advantageous since the intervals at which the prediction is updated are, as a result, fixed. The maximum prediction time can thus, for example, be 10 seconds and each prediction step can be performed, for example, every 0.5 seconds.

In order to start the prediction, a current prediction time is initially fixed and set to the value 0. As of this time, multiple predictions are performed in the preset prediction time steps until such time as the maximum prediction time is reached. A probabilistic free space map is created for each prediction time step, beginning at the current prediction time. Each prediction time step is added to the current prediction time until the maximum prediction time is reached. In addition, confidence regions are fixed around the static and dynamic objects at the current prediction time. The confidence regions describe regions which can be deemed to be occupied by the respective object with a certain degree of probability per grid cell. At least one uncertain region is additionally fixed around at least one dynamic object. It is admittedly conceivable that at least one uncertain region each is fixed for multiple dynamic objects.

This uncertain region describes a region which could potentially be occupied by the dynamic object in future as a result of a movement into said region. Furthermore, the probabilistic free space maps are evaluated. This is advantageous in order to be able to adjust downstream driving functions accordingly, if necessary.

A Bayesian network can be used, for example, for performing the predictions. For example, the presence of static and dynamic objects in the environment, speed, acceleration, direction of movement of the corresponding road user as well as the course of the road would be considered as input variables for the calculation of the probability of a specific trajectory of a dynamic object or of a road user. Furthermore, the consideration of environmental factors such as the weather would be conceivable.

In a particularly preferred embodiment, a free space map is produced for each prediction time step until the maximum prediction time is reached. This is advantageous, since the environment can alter from prediction time step to prediction time step. In this way it is ensured that all of the potential alterations are captured.

In a particularly preferred embodiment, the at least one uncertain region is fixed based on the existing environment model and the trajectory prediction of the dynamic objects.

In a further preferred configuration, the at least one uncertain region is extended along at least one predicted trajectory of a dynamic object. The uncertain region is particularly preferably extended such that at the maximum prediction time all of the possible predicted trajectories are at least partially covered by the uncertain region. This is advantageous since predictions always have a degree of uncertainty which can be considered by the uncertain region.

The uncertain region is particularly preferably adjusted in each time step. As the prediction time increases, the uncertain region becomes larger since the uncertainty increases along the predicted trajectory. For example, the uncertainty is greater if a vehicle is approaching a vehicle driving ahead since, as the time increases and the distance decreases, the probability of a lane change rises. The vehicle could admittedly also brake, which leads to an uncertainty in the prediction.

It is further preferred that, following the evaluation of the probabilistic free space maps for the entire time horizon, a trajectory of an ego vehicle is planned, which is optimized for comfort, performance and safety. Thus, a lane change of the ego vehicle can advantageously be performed in an anticipatory manner in the event of a high degree of uncertainty, in order to prevent an abrupt intervention in the braking or steering at a later time. To this end, a threshold can, for example, be fixed for the uncertainty. If this threshold is exceeded, the preventive driving maneuver is performed. Alternatively, the probability of an uncertain region being occupied can be directly used in a cost function of the optimization. Instead of the lane change, slowing down the ego vehicle would also be conceivable as a preventive measure.

The at least one driving function and/or the trajectory of the ego vehicle is/are particularly preferably optimized by a cost function. With the aid of a cost function, a trajectory of the ego vehicle, for example, in terms of achieving a target speed, a longitudinal acceleration and longitudinal jerk, a transverse acceleration and transverse jerk, safety distances from other road users, necessary reactions of other road users (e.g. strong braking) as well as in terms of the probability of driving through occupied regions of other road users in future or the probability of later uncomfortable interventions is optimized. Alternatively or cumulatively, the optimization in terms of the accuracy of the lane guidance as well as the deviation of the course angle of the vehicle from the course angle of the center of the lane would also be conceivable.

In a further particularly preferred embodiment, the perception area polygon is also incorporated for the optimization of the trajectory. For example, it is advantageous not to drive right up to the left edge of the road in a left-hand bend on a highway, since the sensor technology cannot see said edge sufficiently well. If e.g. lost tire parts were to suddenly appear at the edge of the road, it would only be possible to avoid colliding with these by performing an emergency maneuver. The evaluation is different when the road is obscured by dynamic objects: when driving behind a vehicle, the region in front of the vehicle may possibly be hidden, however it can be assumed that it is possible to drive through this free space for a few seconds, since another object is moving on this trajectory at this moment.

It is conceivable that the direction, acceleration and speed of the predicted trajectories are output in world coordinates. It would also be conceivable to transform the coordinates into a general coordinate system. Thus, the coordinates could preferably be output as road coordinates.

The confidence regions are particularly preferably fixed based on an existence probability, variances of position and speed vectors of the objects as well as the values of the speed and acceleration vectors. As a result, not only can confidence regions be fixed for static objects but also for dynamic objects, since the speeds and accelerations among others are also considered.

In a further preferred embodiment, the uncertain regions are fixed based on the probabilities of trajectories, the values and variances of positions, speeds and accelerations of the individual predicted trajectory points of the objects (V1-V7).

Prior to evaluating the free space maps, grid cells having the same occupancy probability are further preferably merged to form regions which are in each case delimited from one another by means of a corresponding polygonal chain in the free space maps. In this case, the occupancy probability is not necessarily a fixed value, but rather a range of probabilities is to be understood. Thus, a region can, for example, comprise all of the grid cells which have an occupancy probability of more than 90%. In this way, the confidence regions around the road users can, for example, also be considered. Combining the grid cells is advantageous, since less computing power is required for the evaluation thanks to the combining into regions.

Further configurations and embodiments are set out by the drawings, wherein.

Figure 1:
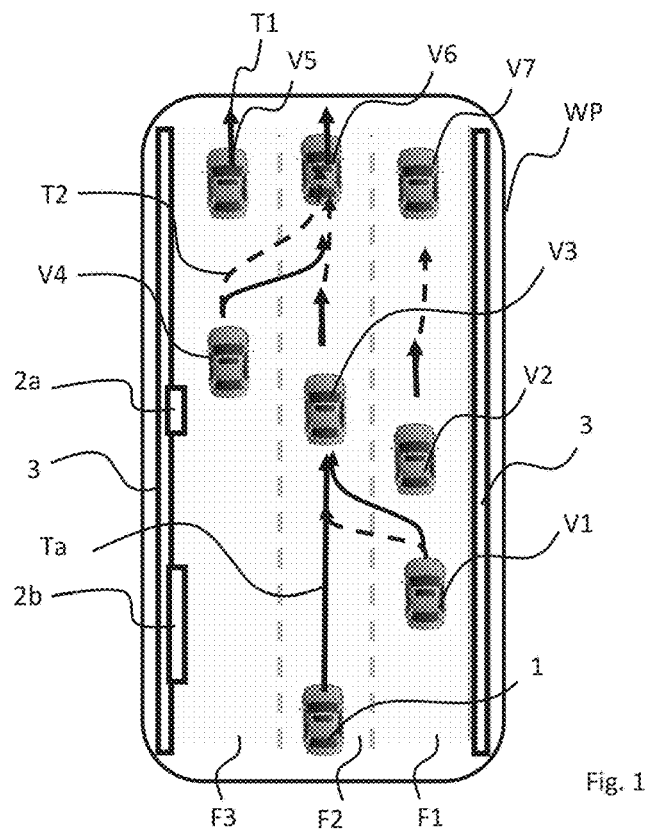
FIG. 1 shows a schematic representation of a free space map according to an embodiment of the invention.

FIG. 1 shows a schematic representation of a free space map according to an embodiment of the invention. In this representation, an ego vehicle 1 is moving together with multiple road users V1-V7 on a road having 3 lanes F1-F3. The ego vehicle 1 is moving along a current trajectory Ta at this time. In addition to the road users V1-V7, a road boundary 3 such as for example a guardrail, as well as further static objects 2a, 2b are furthermore shown in each case. At least two trajectories T1, T2 are predicted for each road user V1-V7. T1 describes the trajectory having the highest probability. The trajectory T2 describes a further possible trajectory having a low probability. T1 is represented by a solid arrow and the trajectory T2 with a dashed arrow. For reasons of clarity, only one trajectory T1, T2 has been identified in each case and not all of the trajectories T1, T2 of all of the road users V1-V7. In addition, a perception area polygon WP is shown. Said perception area polygon WP depicts, within the meaning of the invention, a 360° view around the ego vehicle 1. The static objects 2a, 2b, 3 as well as the perception area polygon WP can be retrieved, for example, from an environment model.

Figure 2:
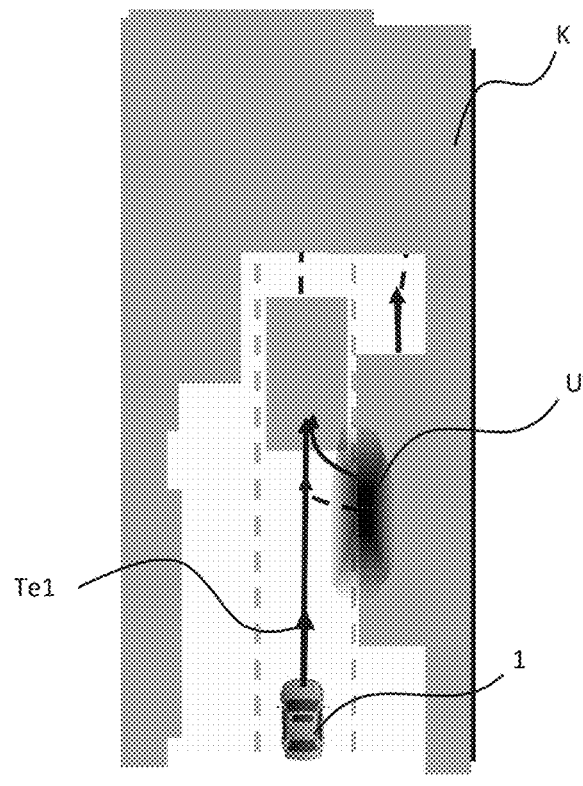
FIG. 2 shows a schematic representation of an extended free space map in accordance with an embodiment of the invention.

A schematic representation of an extended free space map in accordance with an embodiment of the invention is shown in FIG. 2. In the representation shown here, confidence regions K have been fixed around the static 2a, 2b, 3 and dynamic objects or road users V1-V7. In this schematic representation, a rectangular confidence region K is assumed for each static object 2a, 2b, 3 as well as each road user V1-V7, so that multiple confidence regions overlap in this representation. Said confidence regions are deemed to be occupied in the free space map. Furthermore, an uncertain region U is fixed here along the possible trajectories T1, T2 of the road user V1. Depending on the behavior of the road user V1, this uncertain region U can be occupied or remain free. In this connection, it would be conceivable that, alternatively or additionally, at least one further uncertain region U is fixed for one of the other road users V2-V7. In FIG. 2, a time is shown, which corresponds for example to a first prediction time step. The uncertain region U only extends slightly onto the lane F2 of the ego vehicle 1. Therefore, a possible future trajectory Te1 of the ego vehicle 1 furthermore corresponds to the trajectory Ta which is currently being driven, since there is no sufficient requirement for a driving maneuver.

Figure 3:
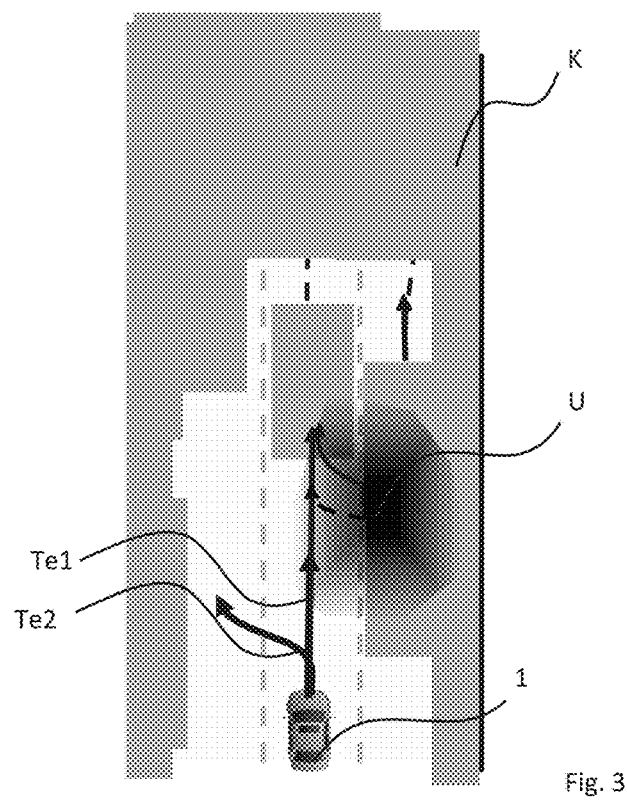
FIG. 3 shows a further schematic representation of an extended free space map in accordance with an embodiment of the invention.

FIG. 3 shows a further schematic representation of an extended free space map in accordance with an embodiment of the invention. The contents of FIG. 3 correspond to those of FIG. 2. The representation admittedly relates to a later prediction time step, which is why the uncertain region U is larger than in FIG. 2. The reason for this is that, as the time increases, V1 e.g. drives closer to V2 and a lane change becomes more probable, but cannot be assumed 100%, since V1 could also brake. The uncertain region U is therefore enlarged. At the same time, a further possible trajectory Te2, in addition to the previous trajectory Te1 along the direction currently being driven, is planned by the ego vehicle 1. This further trajectory Te2 would correspond to a lane change to lane F3.

Figure 4:
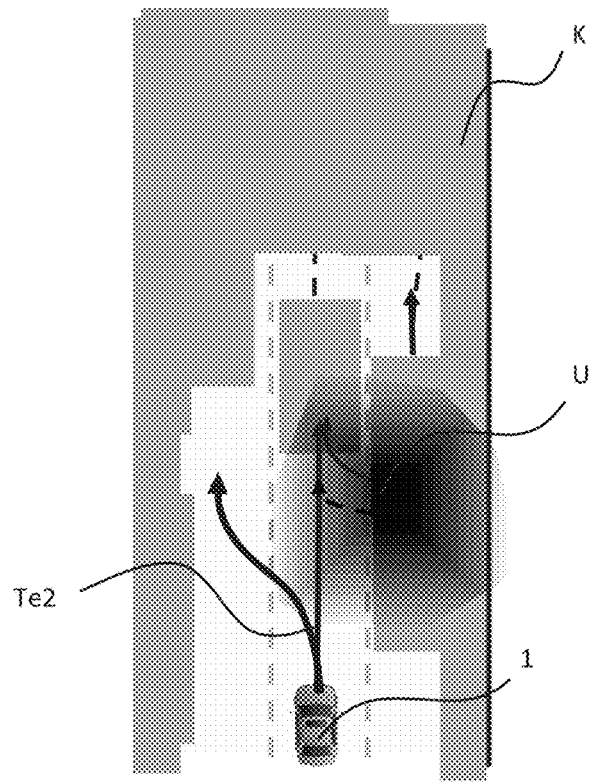
FIG. 4 shows a further schematic representation of an extended free space map in accordance with an embodiment of the invention.

FIG. 4 shows a further schematic representation of an extended free space map in accordance with an embodiment of the invention. Here as well, the representation corresponds to that from FIGS. 2 and 3. FIG. 4 depicts a later prediction time step than FIG. 3. Consequently, the uncertain region U is again enlarged, compared with FIGS. 2 and 3, and already extends over the entire width of the lane F2 of the ego vehicle 1. The potential trajectory Tet of the ego vehicle 1 planned here envisages a lane change in order to already take evasive action before the potential lane change of V1. Consequently, a gentle driving maneuver is performed in good time, which does not result in an intervention in the steering or braking, which would be unpleasant for the driver of the ego vehicle 1.

Figure 5:
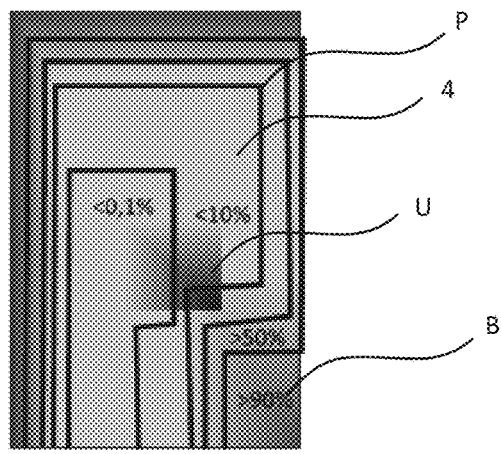
FIG. 5 shows a further schematic representation of an extended free space map in accordance with a further embodiment of the invention.

FIG. 5 shows a further schematic representation of an extended free space map in accordance with a further embodiment of the invention. In this representation, grid cells having the same occupancy probability B have been combined to form corresponding regions 4. These regions 4 are, in each case, delimited by a polygonal chain P. As shown in the figure, there is a region 4, in which the occupancy probability B is less than 0.1%, a region 4 having less than a 10% occupancy probability B, a region having more than a 50% occupancy probability as well as a region 4 having more than a 90% occupancy probability B. The region 4 having a 90% occupancy probability can, for example, consist of the grid cells in which a road user has been sensed as well as the confidence region K around the road user. Furthermore, an uncertain region U is shown, which can overlap several of these regions 4.

Figure 6:
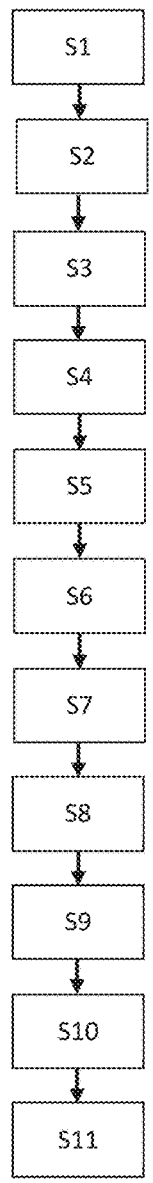
FIG. 6 shows a schematic flow chart of an embodiment of the invention.

FIG. 6 shows a schematic flow chart of an embodiment of the invention. In step S1, static objects 2a, 2b, 3 as well as a perception area polygon WP are retrieved from an existing environment model. In step S2, predicted trajectories T1, T2 of dynamic objects V1-V7 are collected. In a following step S3, the static objects 2a, 2b, 3, the perception area polygon WP and the predicted trajectories T1, T2 are merged in a first free space map. In step S4, a maximum prediction time is fixed and, in step S5, which can also run in parallel with S4, corresponding prediction time steps are fixed. Hereafter, a current prediction time is fixed in step S6 and the value of the current prediction time is set to 0, in order to fix the start of a fixed prediction time period. In step S7, confidence regions K are fixed around the static 2a, 2b, 3 and dynamic objects V1-V7. Furthermore, at least one uncertain region U is fixed around at least one static 2a, 2b, 3 or dynamic object V1-V7 in step S8. In step S9, a first probabilistic free space map is produced for the current prediction time. In step S10, at least one further free space map is created for a prediction time step. This step S10 is repeated until such time as the maximum prediction time is reached. In a further step S11, the produced free space maps, in particular the free space map at the time of the maximum prediction time, are evaluated.

LIST OF REFERENCE NUMERALS

1 Ego vehicle
2a,2b Static object
3 Road boundary
4 Region
B Occupancy probability
F1-F3 Lanes
K Confidence region P Polygonal chain
S1-S11 Method steps
Ta Current trajectory of ego vehicle
Te1,Te2 Potential alternative trajectory of ego vehicle
T1,T2 Potential trajectories of dynamic objects
U Uncertain region
V1-V7 Dynamic objects/road users
WP Perception area polygon

The invention claimed is:

1. A method for creating a probabilistic free space map with static and dynamic objects, having the following steps:
   retrieving static objects as well as a perception area polygon from an existing environment model, wherein the perception area polygon represents a 360-degree view around an ego vehicle and is based on sensor ranges and a geometry of a road;
   collecting predicted trajectories of dynamic objects;
   merging the static objects of the perception area polygon and the predicted trajectories in a first free space map;
   fixing a maximum prediction time;
   fixing prediction time steps;
   fixing a current prediction time and setting the current prediction time to value 0 in order to fix a start of a fixed prediction time period;
   fixing confidence regions around the static and dynamic objects;
   fixing at least one uncertain region around at least one static or dynamic object;
   producing a first probabilistic free space map for the current prediction time;
   producing at least one further free space map for at least one prediction time step; and
   evaluating the produced free space maps.

2. The method according to claim 1, wherein a free space map is produced for each prediction time step until the maximum prediction time is reached.

3. The method according to claim 1, wherein the at least one uncertain region is fixed based on the existing environment model and the trajectory prediction of the dynamic objects.

4. The method according to claim 1, wherein the at least one uncertain region is extended along at least one predicted trajectory of a dynamic object.

5. The method according to claim 1, wherein the uncertain region is adjusted in each time step.

6. The method according to claim 1, wherein following the evaluation of the probabilistic free space map for the entire time horizon, at least one driving function is adjusted and/or a trajectory of the ego vehicle is planned, which is optimized for comfort, performance and safety.

7. The method according to claim 1, wherein the perception area polygon is also considered for the planning of a trajectory of the ego vehicle.

8. The method according to claim 6, wherein the at least one driving function and/or the trajectory of the ego vehicle is/are optimized by a cost function.

9. The method according to claim 1, wherein the confidence regions are fixed based on an existence probability, variances of position and speed vectors of the objects as well as the values of the speed and acceleration vectors.

10. The method according to claim 1, wherein the uncertain regions are fixed based on the probabilities of trajectories, the values and variances of positions, speeds and accelerations of the individual predicted trajectory points of the objects.

11. The method according to claim 1, wherein prior to evaluating the free space maps, grid cells having the same occupancy probability are merged to form regions which are delimited from one another by means of a polygonal chain in the free space maps.

* * * * *